Patented Sept. 17, 1940

2,215,334

UNITED STATES PATENT OFFICE 2,215,334

LEMON JUICE COMPOSITION

Clarence E. Nelson, Chicago, Ill., assignor to Kraft Cheese Company, a corporation of Delaware No Drawing. Application December 3, 1938,
Serial No. 243,769

4 Claims. (Cl. 99—155)

The present invention relates to the preservation of citrus fruit juices and in particular lemon juice. More particularly, the present invention is directed to stable lemon juice compositions for use in the salad dressing art.

It is well known that citrus fruit juice sours and loses its flavor soon after extraction and many attempts have been made heretofore to overcome this difficulty so that the juice can be extracted from the fruit at the groves and shipped directly to the market. All of the previously suggested attempts have been found to possess disadvantages and the products obtained by prior treatments have been found to be unsatisfactory for use in salad dressings and the like.

The attempts of prior investigators to solve this problem may be classified as follows: (1) Heat treatments and (2) chemical treatments. The heat treatments have been of the so-called "pasteurization" type and have been found to yield merely temporary stability as the pasteurized juice must be kept in hermetically sealed containers to avoid deterioration. Pasteurization has also been found to destroy the desired natural flavor of lemon juice, the pasteurized juice having a distinct inferior "artificial" flavor.

The prior chemical treatments include the use of antiseptics such as benzoate of soda, benzoic acid and salicylic acid or other aromatic compounds, and inorganic acids such as hydrochloric acid, hydrofluoric acid and sulfurous ($SO_2$) acids. The use of artificial preservatives of this type give the treated juice a foreign flavor and have been found unsatisfactory. It has also been proposed to stabilize citrus juice by addition of a hydroxy acid such as lactic acid as well as by the addition of sour citrus juice. These treatments have also been found unsatisfactory as they give lemon juice an "off" taste or flavor and the juice so treated has a tendency to mold. In addition, lactic acid has been found unsuitable for use in an emulsified salad dressing such as mayonnaise as lactic acid breaks the egg yolk emulsion causing separation of the oil. The failure of the prior investigators including experts in both the salad dressing and citrus fruit arts to provide a satisfactory product presented an acute problem particularly in the salad dressing art.

I have discovered that the acetic acid vinegars stabilize lemon juice. I have also discovered that the lemon juice-acetic acid vinegar composition is particularly adaptable for use in the salad dressing art.

Lemon juice stabilized by acetic acid vinegar, does not sour or lose flavor and has no tendency to mold. In addition, the vinegar-lemon juice composition has a superior natural taste, being free from foreign flavors found in citrus juice stabilized according to prior art practices. Of great importance the acetic acid vinegar-lemon juice composition does not break emulsions of the mayonnaise type.

Ordinarily the lemon juice composition should contain not less than about 25 percent acetic acid vinegar. The vinegar, however, may make up 50 percent or even as high as 75 percent of the composition. For commercial purposes, a composition containing 25–50 percent vinegar which in turn contains 4.5–6 percent acetic acid is ordinarily preferred. In most cases using undiluted lemon juice containing 5–6 percent citric acid sufficient vinegar is added so that the final composition contains not less than about 1.5 percent acetic acid. When 50 percent of a 6 percent acetic acid vinegar is used as illustrated above the composition contains 3 percent acetic acid. Lower percentages, e. g., 5 percent vinegar containing 6 percent acetic acid, may be employed if the composition is kept cold. Compositions containing less than 5 percent vinegar even when stored at low temperatures break down due to enzymic action.

The acetic acid vinegars suitable for use in the present invention may be of various types including cider, malt, Taragon, Rexamber, White Distilled, etc. In preparing the compositions for use in salad dressings such as mayonnaise the vinegar and lemon juice each supply about 50 percent of the acidity, the stabilized composition being diluted with water so that the total acidity is within the 3–6 percent range.

The present invention makes it possible to extract the juice from the fruit at the source and ship the juice after stabilization directly to the salad dressings manufacturing centers. While the saving in transportation charges is important, the crux of the present invention resides in providing the art with an improved lemon juice composition heretofore unavailable.

In my research investigations I also discovered that sugar of the cane and beet variety may be used to stabilize lemon juice. When using sugar my investigations indicate that a minimum of about 50 percent of sugar should be employed.

It will be understood that the present invention is not limited to the illustrated and preferred examples. All acetic acid vinegar-lemon juice compositions coming within the scope of the present invention are intended to be covered by the claims appended hereto.

I claim:

1. A stable lemon juice composition consisting of fresh lemon juice and acetic acid vinegar, the acetic acid of said composition being about 1.5 to 3 percent.

2. A stable lemon juice composition adaptable for use in the salad dressing art containing 75 to 25 percent lemon juice and 25 to 75 percent acetic acetic acid vinegar.

3. A composition for use in the salad dressing art, comprising 25-50 percent acetic acid vinegar containing about 4.5-6 percent acetic acid and 75-50 percent lemon juice containing about 5-6 percent citric acid.

4. The method of stabilizing lemon juice and preparing a composition for use in the salad dressing art which comprises adding about 25 to 75 percent of acetic acid vinegar to fresh extracted lemon juice.

CLARENCE E. NELSON.